(12) United States Patent
Saito et al.

(10) Patent No.: US 12,462,139 B2
(45) Date of Patent: Nov. 4, 2025

(54) RFID TAG

(71) Applicant: FUJITSU FRONTECH LIMITED, Inagi (JP)

(72) Inventors: Akihiko Saito, Inagi (JP); Yasunao Mizutani, Inagi (JP); Yoshiyasu Sugimura, Inagi (JP); Tsuyoshi Niwata, Inagi (JP); Mimpei Miura, Inagi (JP); Hideo Miyazawa, Inagi (JP); Mao Kikukawa, Inagi (JP)

(73) Assignee: FUJITSU FRONTECH LIMITED, Tokyo (JP)

( * ) Notice: Subject to any disclaimer, the term of this patent is extended or adjusted under 35 U.S.C. 154(b) by 0 days.

(21) Appl. No.: 18/358,412

(22) Filed: Jul. 25, 2023

(65) Prior Publication Data

US 2024/0046061 A1    Feb. 8, 2024

Related U.S. Application Data

(63) Continuation of application No. PCT/JP2021/006003, filed on Feb. 17, 2021.

(51) Int. Cl.
*G06K 19/077* (2006.01)

(52) U.S. Cl.
CPC ... *G06K 19/07773* (2013.01); *G06K 19/0776* (2013.01)

(58) Field of Classification Search
CPC ......... G06K 19/07773; G06K 19/0776; G06K 19/07754
See application file for complete search history.

(56) References Cited

U.S. PATENT DOCUMENTS

| | | | |
|---|---|---|---|
| 6,100,804 A * | 8/2000 | Brady ................ | A01K 11/006 342/51 |
| 6,421,013 B1 * | 7/2002 | Chung ................ | H01L 21/56 235/441 |
| 6,440,773 B1 | 8/2002 | Usami | |
| 10,198,684 B2 * | 2/2019 | Pueschner ........ | G06K 19/07722 |
| 10,659,106 B2 * | 5/2020 | Omori ............... | G06K 19/077 |
| 2002/0036237 A1 | 3/2002 | Atherton et al. | |

(Continued)

FOREIGN PATENT DOCUMENTS

| | | |
|---|---|---|
| JP | 07146922 A | 6/1995 |
| JP | 2003256798 A | 9/2003 |

(Continued)

OTHER PUBLICATIONS

Search report issued in corresponding European patent application No. EP 21 926 518.8 on Mar. 4, 2024.

(Continued)

*Primary Examiner* — Thien M Le
*Assistant Examiner* — Asifa Habib
(74) *Attorney, Agent, or Firm* — Greer Burns & Crain Ltd.

(57) ABSTRACT

An RFID tag includes a sheet-like substrate, an IC chip disposed on a first face of the substrate, a conductive adhesive that is positioned around the IC chip along the first face and fixes the IC chip to the substrate, an antenna pattern formed on a second face, of the substrate, that is opposite to the first face, and a through hole that penetrates the substrate toward the conductive adhesive around the IC chip and electrically connects the antenna pattern with the IC chip.

1 Claim, 4 Drawing Sheets

(56) References Cited

U.S. PATENT DOCUMENTS

| | | | | |
|---|---|---|---|---|
| 2003/0122233 | A1* | 7/2003 | Yagi | G06K 19/07749 257/E23.064 |
| 2004/0124983 | A1 | 7/2004 | Kuroda et al. | |
| 2007/0069036 | A1* | 3/2007 | Baba | G06K 19/07749 235/492 |
| 2008/0012709 | A1* | 1/2008 | Stobbe | G06K 19/07758 340/572.1 |
| 2008/0187762 | A1* | 8/2008 | Hayashi | B29C 45/2806 264/328.18 |
| 2009/0115577 | A1* | 5/2009 | Kobayashi | G06K 19/07728 340/10.1 |
| 2010/0148380 | A1* | 6/2010 | Hayashi | C08G 59/3245 257/793 |
| 2011/0074001 | A1* | 3/2011 | Rietzler | G06K 19/07745 257/679 |
| 2012/0024959 | A1* | 2/2012 | Minagawa | G06K 19/07754 257/E21.705 |
| 2013/0154885 | A1* | 6/2013 | Schindler | G06K 19/07779 156/247 |
| 2015/0144702 | A1* | 5/2015 | Mei | G06K 19/0775 235/488 |
| 2015/0339565 | A1* | 11/2015 | Pueschner | H01L 21/56 235/488 |
| 2017/0017872 | A1* | 1/2017 | Kato | G06K 19/07722 |
| 2017/0062904 | A1* | 3/2017 | Matsumura | H01Q 1/2225 |
| 2019/0073579 | A1* | 3/2019 | Kato | G06K 19/07783 |
| 2019/0288368 | A1* | 9/2019 | Forster | G06K 19/07771 |
| 2020/0042852 | A1* | 2/2020 | Omori | G06K 19/07724 |
| 2020/0074263 | A1* | 3/2020 | Ueki | H01Q 1/36 |
| 2020/0202192 | A1* | 6/2020 | Hu | G06K 19/06028 |
| 2021/0159601 | A1* | 5/2021 | Ueki | G06K 19/02 |
| 2021/0406636 | A1* | 12/2021 | Calvas | G06K 19/07745 |
| 2022/0367325 | A1* | 11/2022 | Niccum | H01L 23/4985 |
| 2022/0414412 | A1* | 12/2022 | Huhtasalo | H01Q 1/40 |
| 2023/0027226 | A1* | 1/2023 | Lotya | G06K 19/02 |
| 2024/0046061 | A1* | 2/2024 | Saito | G06K 19/07754 |

FOREIGN PATENT DOCUMENTS

| | | |
|---|---|---|
| JP | 2004133762 A | 4/2004 |
| JP | 2004165531 A | 6/2004 |
| JP | 2011521367 A | 7/2011 |
| JP | 2018125780 A | 8/2018 |
| JP | 6485608 B1 | 3/2019 |

OTHER PUBLICATIONS

Office action issued for corresponding Japanese patent application No. 2023-500198, dated Dec. 19, 2023.
ISR issued in PCT/JP2021/006003, mailed May 25, 2021.
Written Opinion of the ISR issued in PCT/JP2021/006003, dated May 25, 2021.
Office action issued in corresponding European patent application No. 21 926 518.8, dated Jul. 4, 2025.

* cited by examiner

RFID TAG

CROSS-REFERENCE TO RELATED APPLICATION

This application is continuation application of International Application PCT/JP2021/006003 filed on Feb. 17, 2021 and designated the U.S., the entire contents of which are incorporated herein by reference.

FIELD

The embodiments discussed herein are related to an RFID tag.

BACKGROUND

In recent years, radio frequency identifier (RFID) tags have been attached to various objects, and the objects have been managed using information read from the RFID tags by a reader. For example, the RFID tag is used as an RFID label attached to an object and used.

Related Art Documents: JP 6485608 B and JP H7-146922 A

SUMMARY

An RFID tag of the disclosure includes a sheet-like substrate, an IC chip disposed on a first face of the substrate, a conductive adhesive that is positioned around the IC chip along the first face and fixes the IC chip to the substrate, an antenna pattern formed on a second face of the substrate, the second face being opposite to the first face, and at least one through hole that penetrates the substrate toward the conductive adhesive around the IC chip and electrically connects the antenna pattern with the IC chip.

The object and advantages of the present invention will be realized by the elements set forth in the claims or combinations thereof.

DESCRIPTION OF EMBODIMENTS

Figure 3:
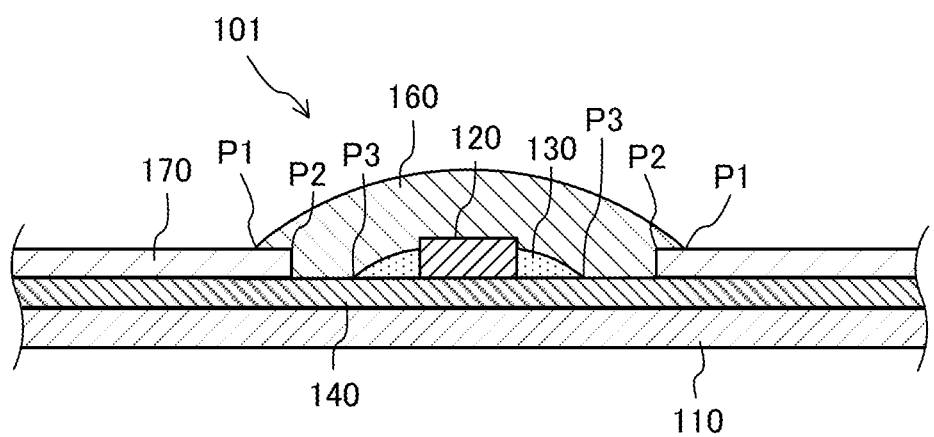
FIG. 3 is a cross-sectional view for explaining a configuration of an RFID tag according to a reference technique.

FIG. 3 is a cross-sectional view for explaining a configuration of an RFID tag 101 according to the reference technique.

Figure 4:
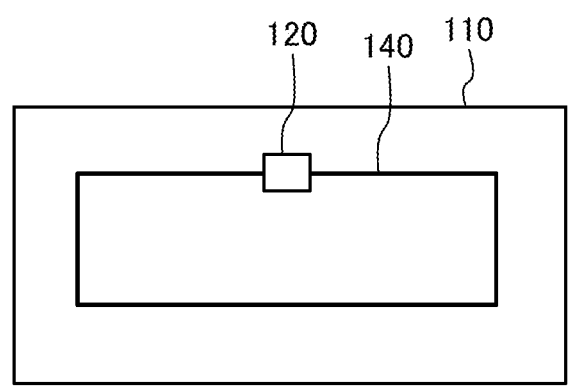
FIG. 4 is a view illustrating a pattern example of an antenna pattern in the reference technique.

FIG. 4 is a diagram illustrating a pattern example of an antenna pattern 140 in the reference technique.

The RFID tag 101 illustrated in FIG. 3 includes a substrate 110, an integrated circuit (IC) chip 120, a conductive adhesive 130, the antenna pattern 140, a potting 160, and a protective layer 170.

The IC chip 120 is disposed on the antenna pattern 140 formed on the substrate 110, and is fixed by the conductive adhesive 130.

The antenna pattern 140 is formed between the substrate 110 and the IC chip 120, and is formed in, for example, a loop shape as illustrated in FIG. 4.

The potting 160 is disposed so as to cover the IC chip 120 and the conductive adhesive 130 in order to protect the IC chip 120.

The protective layer 170 protects the antenna pattern 140. For example, the protective layer 170 has a circular hole in order to avoid interference with the IC chip 120 and the conductive adhesive 130. Therefore, the protective layer 170 is formed with a space between the IC chip 120 and the conductive adhesive 130. Part of the protective layer 170 is covered with the potting 160.

Physical stress is applied to such an RFID tag 101, for example, when the RFID tag is attached to a linen product and washed together with the linen product. When this physical stress is applied to the RFID tag 101, stress is concentrated on a first stress concentration position P1 around the potting 160, a second stress concentration position P2 at the end, of the protective layer 170, adjacent to the IC chip 120, a third stress concentration position P3 around the conductive adhesive 130, and the like. This causes a problem that the antenna pattern 140 is disconnected, the RFID tag 101 is unresponsive or communication performance is deteriorated.

Hereinafter, an RFID tag according to an embodiment of the present invention will be described with reference to the drawings.

Figure 1:
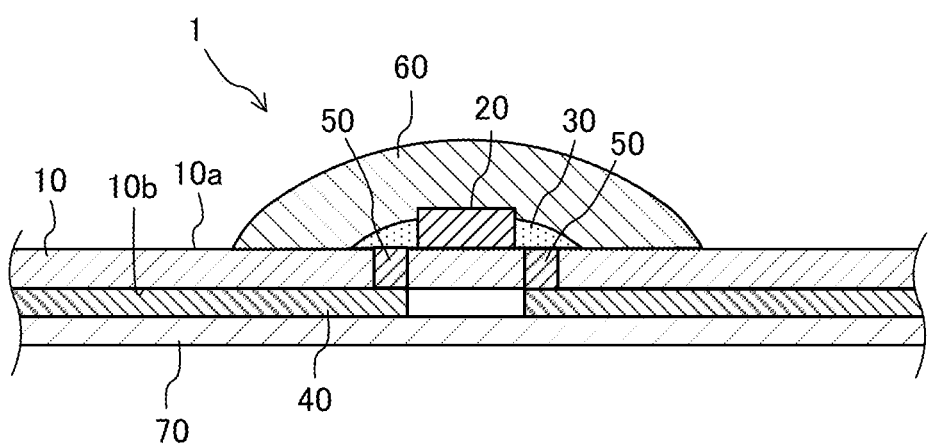
FIG. 1 is a cross-sectional view for explaining a configuration of an RFID tag according to an embodiment.

FIG. 1 is a cross-sectional view for explaining a configuration of an RFID tag 1 according to an embodiment.

The RFID tag 1 illustrated in FIG. 1 includes a substrate 10, an IC chip 20, a conductive adhesive 30, an antenna pattern 40, two through holes 50, a potting 60, and a protective layer 70.

As an example, the RFID tag 1 is used as part of an RFID label attached to an object.

The substrate 10 is a sheet-like member, and is, for example, a film made of a synthetic resin material such as Polyethylene terephthalate (PET). The substrate 10 preferably has flexibility from the viewpoint of durability.

The IC chip 20 is disposed on a first face 10a (upper face in FIG. 1) of the substrate 10. The IC chip 20 can be regarded as a large scale integration (LSI).

The conductive adhesive 30 is an adhesive for fixing the IC chip 20 to the substrate 10, and has conductivity. The conductive adhesive 30 is, for example, anisotropic conductive paste (ACP). For example, the conductive adhesive 30 is applied to the substrate 10 before the IC chip 20 is disposed on the substrate 10, and spreads from the bottom face of the IC chip 20 along the first face 10a of the substrate 10 when the IC chip 20 is mounted. In this manner, the conductive adhesive 30 is positioned to spread around the IC chip 20 along the first face 10a of the substrate 10.

The antenna pattern 40 is formed on a second face 10b, of the substrate 10, that is opposite to the first face 10a. The antenna pattern 40 is, for example, a dipole antenna, and has two ends facing each other with a gap at a position of the second face 10b of the substrate 10, the position facing away from the IC chip 20. That is, the antenna pattern 40 is not located at a position facing away from the IC chip 20 with the substrate 10 interposed between the position and the IC chip. The antenna pattern 40 is made of, for example, silver paste.

The two through holes 50 penetrate the substrate 10 toward the conductive adhesive 30 around the IC chip 20, and are provided to electrically connect the antenna pattern 40 with the IC chip 20. The through hole 50 may be electrically connected to the bump of the IC chip 20 fixed by the conductive adhesive 30 via wiring (not illustrated) on the first face 10*a* of the substrate 10, for example. The through hole 50 may be formed integrally with the antenna pattern 40.

The two through holes 50 may penetrate the substrate 10 and communicate the above-described two ends of the antenna pattern 40 and the conductive adhesive 30. Depending on the shape of the antenna pattern 40, only one through hole 50 may be provided, or three or more through holes may be provided.

The potting 60 is provided on the first face 10*a* of the substrate 10 so as to cover the IC chip 20 and the conductive adhesive 30 in order to protect the IC chip 20. The potting 60 is made of, for example, a synthetic resin material. Note that the potting 60 is an example of a reinforcing material that covers the IC chip 20 and the conductive adhesive 30.

The protective layer 70 is a layer that protects the antenna pattern 40 formed on the second face 10*b* of the substrate 10, and is, for example, a resist layer. The protective layer 70 is made of, for example, a synthetic resin material.

In the RFID tag 1 according to the present embodiment, as described above, the antenna pattern 40 is formed on the second face 10*b* opposite to the first face 10*a*, of the substrate 10, on which the conductive adhesive 30, the potting 60, and the like are provided.

Therefore, even when the stress concentrates on the periphery of the potting 60 (the first stress concentration position P1 around the potting 160 of the reference technique shown in FIG. 3) or on the periphery of the conductive adhesive 30 (the stress concentration position P3 around the conductive adhesive 130), the antenna pattern 40 is not easily affected. In addition, since the protective layer 70 together with the antenna pattern 40 is provided adjacent to the second face 10*b*, it is possible to cover the entire antenna pattern 40, and thus, unlike the protective layer 170 of the reference technology illustrated in FIG. 3, it is possible to avoid stress concentration on the end (second stress concentration position P2) of the protective layer 170.

Although the antenna pattern 40 is formed on the second face 10*b*, the through hole 50 penetrates the substrate 10 toward the conductive adhesive 30 instead of penetrating the substrate 10 toward the IC chip 20, so that the antenna pattern 40 can be formed so as not to pass a position facing away from the IC chip 20. Therefore, even when the stress concentrated around (peripheral edge) of the IC chip 20 affects the second face 10*b* on the back side via the substrate 10, the antenna pattern 40 is not affected by the stress.

Next, an RFID tag 2 according to a comparative example will be described with reference to FIG. 2.

Figure 2:
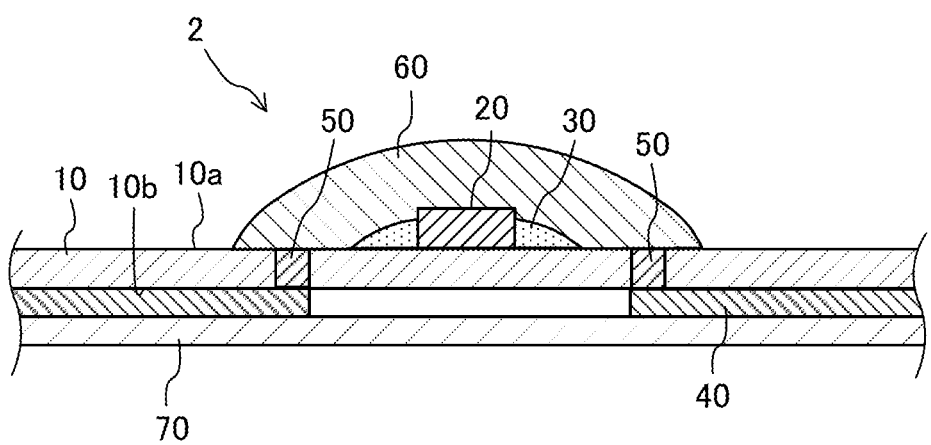
FIG. 2 is a cross-sectional view for explaining a configuration of an RFID tag according to a comparative example.

FIG. 2 is a cross-sectional view for explaining a configuration of the RFID tag 2 according to a comparative example.

Since the RFID tag 2 illustrated in FIG. 2 is different from the RFID tag 1 illustrated in FIG. 1 only in the positions of the through holes 50 (the positions of the two ends of the antenna pattern 40), the reference numerals of the respective parts are common to those of the RFID tag 1 illustrated in FIG. 1.

Unlike the through hole 50 of the RFID tag 1, the through hole 50 of the RFID tag 2 does not penetrate the substrate 10 toward the conductive adhesive 30 around the substrate 10 but penetrates the substrate 10 toward the potting 60 around the conductive adhesive 30. Even in this case, as described above, the through hole 50 may be electrically connected to the bump of the IC chip 20 fixed by the conductive adhesive 30 via wiring (not illustrated) on the first face 10*a* of the substrate 10.

Even in such an RFID tag 2, it can be said that even when the stress concentrates on the periphery of the potting 60 (the first stress concentration position P1 around the potting 160 of the reference technique shown in FIG. 3) or on the periphery of the conductive adhesive 30 (the stress concentration position P3 around the conductive adhesive 130), the antenna pattern 40 is not easily affected.

However, since there is a gap between the through hole 50, and the conductive adhesive 30 and the IC chip 20, stress tends to concentrate on wires on the periphery of the conductive adhesive 30 among wiring, (not illustrated) on the first face 10*a* of the substrate 10, disposed at this gap.

In the present embodiment described above, the RFID tag 1 includes the sheet-like substrate 10, the IC chip 20 disposed on the first face 10*a* of the substrate 10, the conductive adhesive 30 that is positioned around the IC chip 20 along the first face 10*a* and fixes the IC chip 20 to the substrate 10, the antenna pattern 40 formed on the second face 10*b*, of the substrate 10, that is opposite to the first face 10*a*, and the through hole 50 that penetrates the substrate 10 toward the conductive adhesive 30 around the IC chip 20 and electrically connects the antenna pattern 40 with the IC chip 20.

As described above, by forming the antenna pattern 40 on the second face 10*b* opposite to the first face 10*a* of the substrate 10 instead of on a face (first face 10*a*) same as a face on which the IC chip 20, the conductive adhesive 30, and the like are mounted, it is possible to suppress disconnection of the antenna pattern 40 due to stress concentrated on discontinuous points such as the periphery of the conductive adhesive 30 and the periphery of the potting 60.

In addition, since the protective layer 70 for protecting the antenna pattern 40 can also be provided on the second face 10*b*, it is possible to avoid stress concentration on an edge (end) of a hole when forming, for example, the circular hole in the protective layer 70 in order to avoid interference with the IC chip 20 and the conductive adhesive 30. As a result, it is also possible to avoid occurrence of disconnection in the antenna pattern 40 due to concentration of stress at the end of the protective layer 70.

Furthermore, since the through hole 50 does not penetrate the substrate 10 toward the IC chip 20 but penetrates the substrate 10 toward the conductive adhesive 30, the antenna pattern 40 can be formed so as not to pass a position facing away from the IC chip 20. Therefore, it is also possible to avoid the stress concentrated on a position, of the second face 10*b*, facing away from the periphery of the IC chip 20 from affecting the antenna pattern 40.

Therefore, according to the present embodiment, disconnection of the antenna pattern 40 can be suppressed. As a result, it is possible to suppress unresponsiveness or communication performance deterioration of the RFID tag 1.

In addition, in the present embodiment, the antenna pattern 40 has two ends facing each other with a gap at a position of the second face 10*b* of the substrate 10, the position facing away from the IC chip 20, and the through hole 50 includes two through holes that electrically connect the two respective ends of the antenna pattern 40 and the IC chip 20.

In this way, since the antenna pattern 40 does not pass a position facing away from the IC chip 20, it is possible to avoid the stress concentrated on a position, of the second face 10*b*, facing away from the periphery of the IC chip 20 from affecting the antenna pattern 40 as described above.

Note that the present invention is not limited to the above-mentioned embodiment as it is, and can be embodied by modifying components thereof. For example, various inventions can be formed by appropriately combining a plurality of components disclosed in the present embodiment. Various modifications of the invention and applications can be made without departing from the spirit of the invention.

The invention claimed is:

1. An RFID tag comprising:
    a substrate;
    an IC chip disposed on a first face of the substrate;
    a conductive adhesive that is positioned around the IC chip along the first face and fixes the IC chip to the substrate;
    a reinforcing material provided on the first face of the substrate in order to protect the IC chip, where the reinforcing material is provided only in a part of the first face of the substrate that includes a position covering the IC chip and the conductive adhesive;
    an antenna pattern formed in a loop shape on a second face of the substrate, the second face being opposite to the first face; and
    at least one through hole that penetrates the substrate and communicates with the antenna pattern and the conductive adhesive in an area covered by the reinforcing material around the IC chip and electrically connects the antenna pattern with the IC chip, wherein
    the antenna pattern has two ends facing each other with a gap at a position of the second face of the substrate, the position facing away from the IC chip, and
    the at least one through hole comprises only two through holes that electrically connect the two respective ends of the antenna pattern with the IC chip.

* * * * *